United States Patent
Duncan et al.

[11] Patent Number: 6,134,798
[45] Date of Patent: Oct. 24, 2000

[54] CONDUIT SUPPORT

[75] Inventors: Scott E. Duncan; Ronald A. Cox, both of Santa Rosa, Calif.

[73] Assignee: E-Ticket Enterprises, LLC, Santa Rosa, Calif.

[21] Appl. No.: 09/135,772

[22] Filed: Aug. 18, 1998

Related U.S. Application Data
[60] Provisional application No. 60/055,802, Aug. 15, 1997.

[51] Int. Cl.[7] .................... G01B 5/02; B26D 7/01
[52] U.S. Cl. .................... 33/484; 33/529; 33/712; 269/902; 83/167
[58] Field of Search ............... 33/484, 483, 485, 33/490, 492, 511, 529, 549, 568, 571, 573, 712, 832, 201; 269/95, 296, 902, 307; 83/167, 743; 220/694, 735, 729; 206/373

[56] References Cited

U.S. PATENT DOCUMENTS

| | | | |
|---|---|---|---|
| 1,842,573 | 1/1932 | Van Treek | 269/254 R |
| 3,843,110 | 10/1974 | Smith | 83/762 |
| 4,945,648 | 8/1990 | Roth et al. | 33/529 |
| 5,092,571 | 3/1992 | Stevens | 269/269 |
| 5,101,932 | 4/1992 | Trudgeon | 182/129 |
| 5,207,137 | 5/1993 | Baril | 83/167 |
| 5,727,778 | 3/1998 | Nodar | 269/296 |
| 5,813,306 | 9/1998 | Jacoff | 83/762 |

*Primary Examiner*—Andrew H. Hirshfeld
*Attorney, Agent, or Firm*—Malcolm B. Wittenberg

[57] ABSTRACT

A device for facilitating measuring and cutting conduit. The device includes two end plates sized and configured for receiving conduit while being provided with a surface for resisting rotation of the conduit as it resides upon and is supported by the end plates. A planar ruled member is attached to and supports both of the end plates preferably at a distance so that the device can be supported by the circumference of a standard five gallon bucket.

10 Claims, 4 Drawing Sheets

CONDUIT SUPPORT

This application claims the benefit of provisional application No. 60/055,802, filed on Aug. 15, 1997.

TECHNICAL FIELD OF THE INVENTION

The present invention deals with a device and method for employing the device and facilitating the measuring and cutting of conduit. The present invention is intended to be used in conjunction with a standard five gallon bucket enabling conduit to be measured and cut while being supported by the open end of the bucket.

BACKGROUND OF THE INVENTION

General contractors, plumbers and others in the building trades oftentimes have a need to measure and cut conduit, pipe, dowels and similar elongated members, hereinafter referred to as conduit, on site at a construction project. The cutting of conduit on site can be a difficult task for it requires a tape measure or similar expedient to measure the conduit to be cut and a support for resting the conduit during the cutting operation. Oftentimes, a construction worker will try to rest the conduit on his knee for lack of a suitable support. Not only are the resulting cut segments less than ideal but the worker can seriously injure himself if the saw was to slip.

Virtually all builders, contractors and plumbers carry with them a standard five-gallon plastic bucket. The five-gallon plastic bucket has become such a staple article for such workers that others have suggested and sold various annular extensions which fit upon the lip of the bucket in order to increase its side wall dimension. Such buckets are used to carry miscellaneous items such as hammers, nails, tape measures and other assorted odds and ends.

The present invention deals with an attempt to make the cutting of conduit on a job site more convenient by providing a simple utensil which can be employed with the above-noted standard five-gallon bucket.

SUMMARY OF THE INVENTION

The present invention is directed to a device for facilitating, measuring and cutting conduit. The device comprises two end plates, sized and configured for receiving conduit and being provided with means for resisting rotation of the conduit as the conduit resides upon and is supported by the end plates. A planar ruled member is employed for attachment to the end plates. Ideally, the planar ruled member is of sufficient length to position the end plates slightly beyond the diameter of the open end of the bucket.

DETAILED DESCRIPTION OF THE INVENTION

Figure 1:
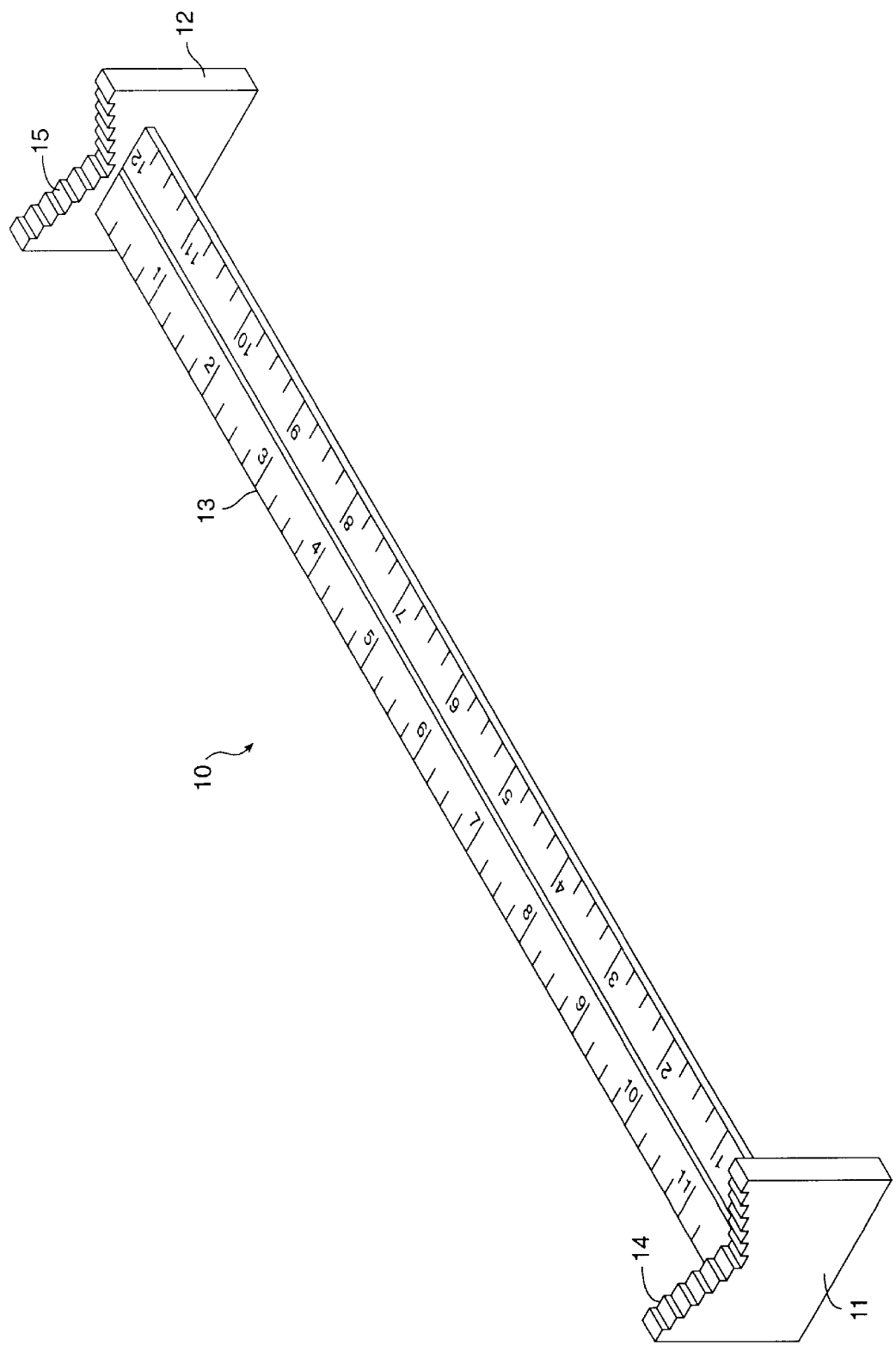
FIG. 1 is a perspective view of the device of the present invention.
Figure 2A:
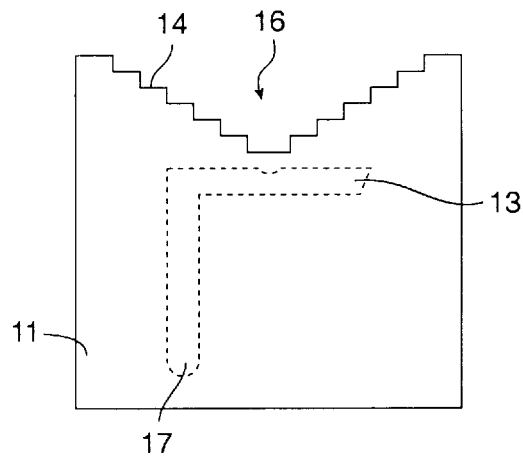
FIGS. 2a and 2b are end views of alternative embodiments of the device of the present invention.

FIG. 1 is a perspective view of the present invention. As noted, a planar section 13 which displays ruler markings for measuring conduit to be cut is supported at either end by end plates 11 and 12. Although shown and referred to as a planar ruled member, section 13 can have various cross sectional configurations such as being "W" or "V" shaped. End plates 1 1 and 12 are oriented substantially perpendicularly to ruled section 13 while each is roughly configured into a V-shaped profile 16 FIGS. 2a and 2b having toothed surfaces 14 and 15.

In operation, conduit (not shown) is placed on tooth-shaped surfaces 14 and 15 and measured by the ruler markings on ruled section 13. By pressing conduit firmly against tooth surfaces 14 and 15, the conduit can substantially be prevented from rotating while a hand saw or other suitable means can be used to make the appropriate cuts. In this regard, although not shown, the tooth sections 14 and 15 can be biased in one or more directions so that the pulling or pushing of a hand saw by a left or right-handed worker can more readily be resisted to minimize rotation of the conduit during cutting.

Figure 2B:
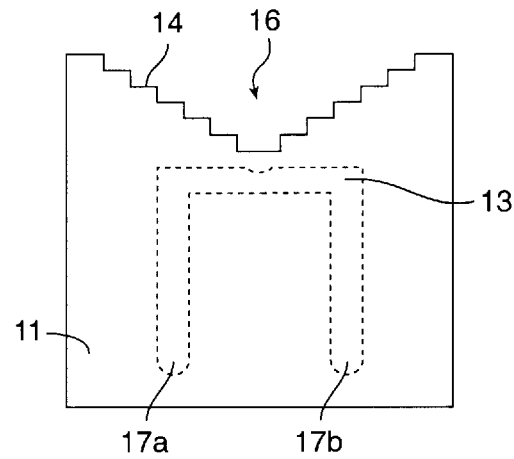
Figure 3:
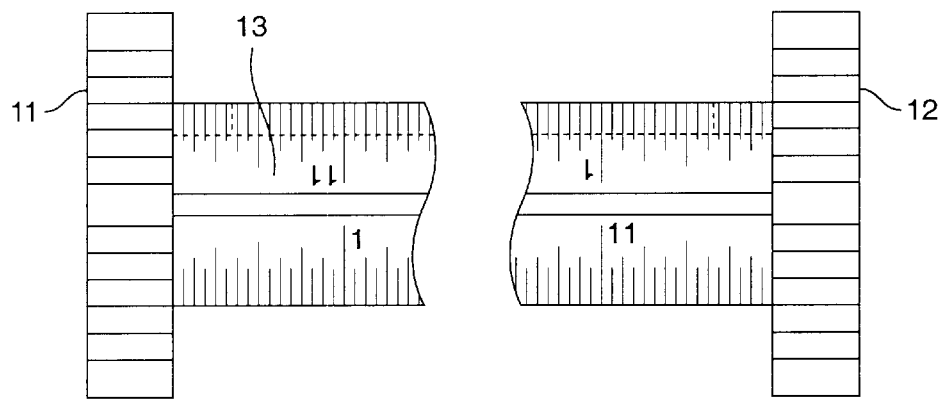
FIG. 3 is a top view of the device of the present invention.
Figure 4:
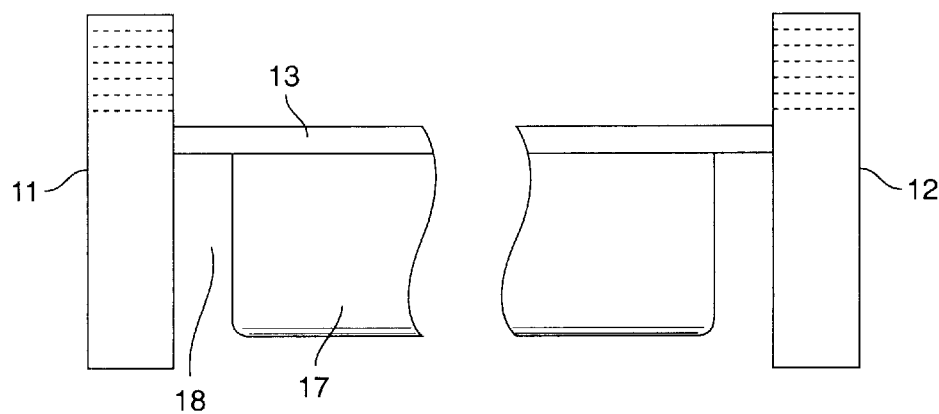
FIG. 4 is a side view of the device of the present invention.

As noted, the present invention is intended to be used in conjunction with a standard five-gallon plastic bucket. In this regard, reference is made to FIG. 4 wherein a side view of the present invention is shown with the center portion of planar section 13 eliminated. In this regard, downwardly extending leg 17 is employed to enhance the structural rigidity of the present invention. There is, however, a gap between the two ends of extension 17 and end members 11 and 12. The created gap 18 is sized so that the circumferential edge of the five-gallon plastic bucket can fit within this space as a convenient and stable nesting area for this device. As noted in comparing FIGS. 2a and 2b, extension 17 is not the only geometry useful in adding structural rigidity to the support. As shown in FIG. 2b, a box-like structure composed of ruled section 13 and downwardly extending sections 17a and 17b can also be used.

Figure 5:
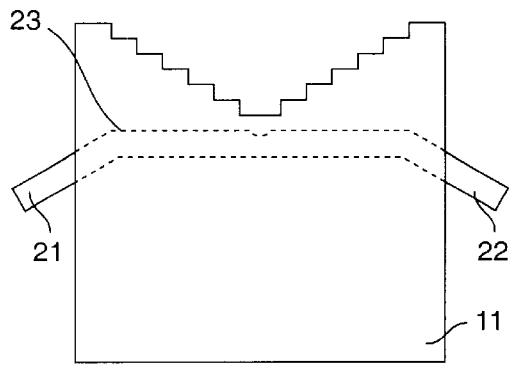
FIG. 5 is an end view of still another embodiment of the device of the present invention.
Figure 6:
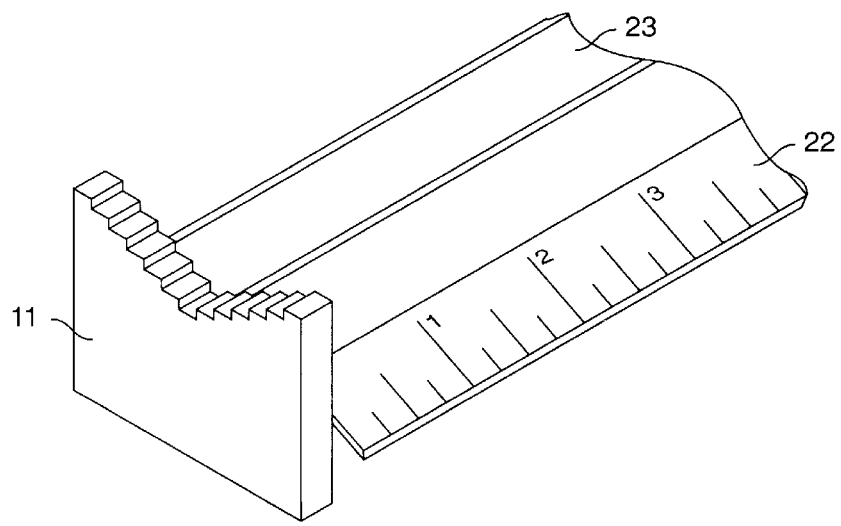
FIG. 6 is a partial, perspective view of the device of FIG. 5.

As a further embodiment, it has been noted in using the device of the present invention that when conduit of large width or circumference is placed upon end members 11 and 12 that the ruler markings of planar section 13 can be obliterated. In enabling the worker to view ruler markings in this instance, the expedient shown in FIGS. 5 and 6 is suggested. Specifically, planar extensions 21 and 22 are diagonally angled from planar section 23 whereby planar extensions 21 and 22 are provided with their own ruler markings which will normally project beyond the width or diameter of any conduit resting upon end members 11 and 12.

Figure 7:
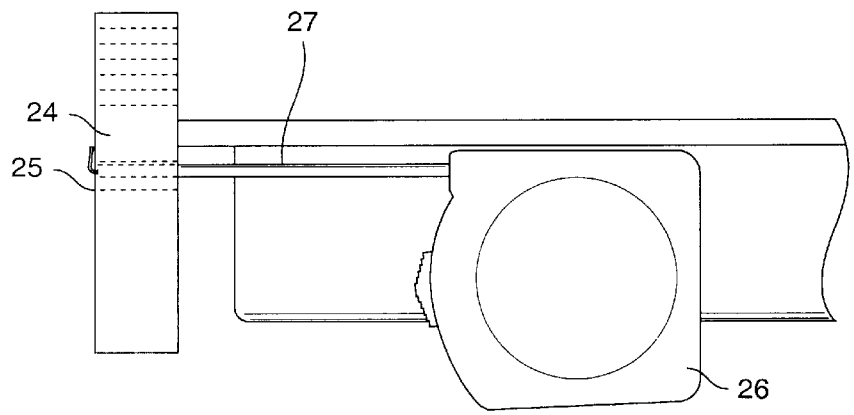
FIG. 7 is a side view of the device of the present invention, in use with a tape measure.
Figure 8:
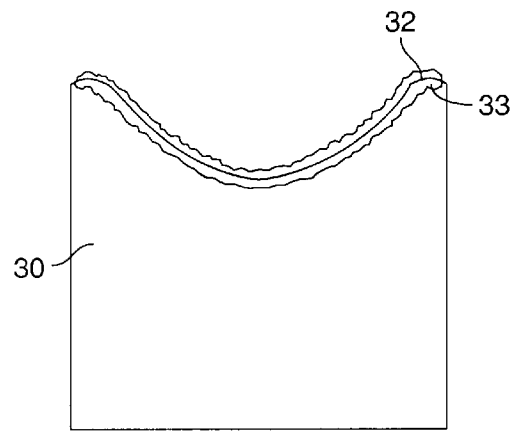
FIGS. 8 and 9 are end views of alternative end plates of the present invention.

As a further expedient, it is proposed that the present invention be provided with means for securing a tape measure to enhance the flexibility of the present invention. Reference is made to FIG. 7 showing tape measure 26 securely fastened below planar section 13 and to the side of extension 17. In use of tape measure 26, opening 25 is configured within end member 24 to enable tape 27 extending from tape measure 26 to extend through end member 24 in order to measure conduit extending beyond planar section 13 and its associated ruler markings.

Up to this point, the end members were shown with tooth-shaped surfaces 14 and 15 to reduce the tendency of a conduit having a rounded circumference from turning on the support as the conduit is experiencing torque as a result of it being cut with a hand saw. In fact, the present invention contemplates any suitable means of reducing the tendency of the conduit to rotate when engaged with the end members of the support. For example, end member 30 can be provided with a curved surface 32 rather than the toothed surface shown in the remaining figures. In order to reduce the tendency of conduit to rotate while in contact with end member 30, a friction enhancing material such as polyurethane 33 can be coated upon curved surface 32.

Figure 9:
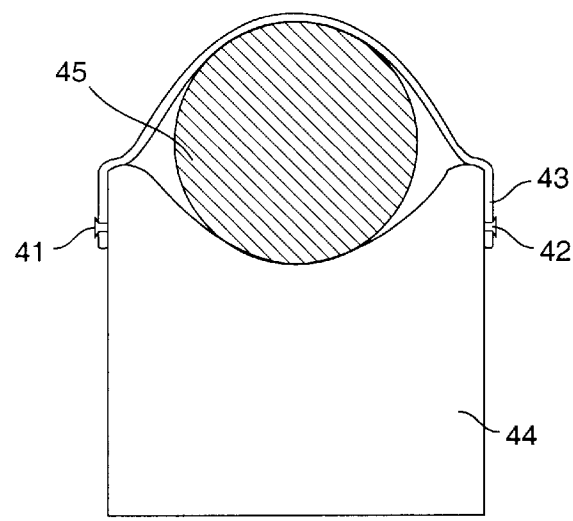

To further enhance the tendency of the support to reduce rotation of conduit, reference is made to the embodiment shown in FIG. 9. In this instance, conduit 45, shown in cross section, is placed upon end unit 44. In this embodiment, button pegs 41 and 42 can be provided which releasably maintain elastic stretch cord 43 in place. It is contemplated that stretch cord 43, such as a bungee cord, is sized to tightly stretch over conduit 45 increasing friction between stretch cord 43 and the surface of conduit 45 which acts to reduce tendency of conduit 45 to rotate during cutting. In this regard, it is contemplated that the user of the present invention inventory various sizes of stretchable member 43 in order to accommodate conduit of various diameters.

Figure 10:
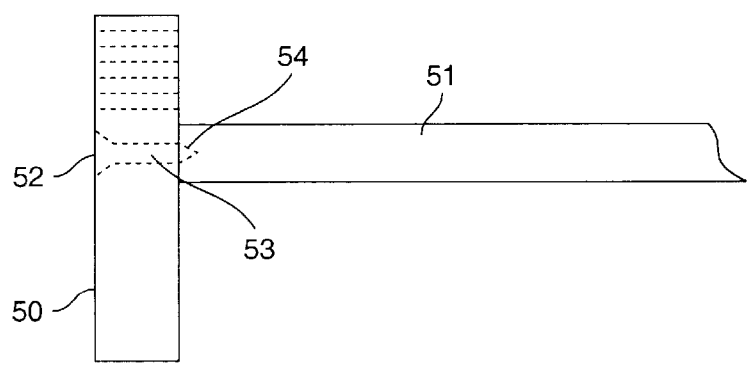
FIG. 10 is a partial, side view of the device of the present invention.

FIG. 10 is provided in order to illustrate the notion that the present invention contemplates the removability of end members making such members interchangeable between those shown, for example, in FIGS. 2a and 2b, FIG. 8 and FIG. 9. Specifically, ruled section 51 is shown abutting end member 50 which is held in place by screw 53 placed within tapped hole 52. As noted, the hole continues its taper into planar ruled section 51 at indent 54.

What is claimed is:

1. A device for facilitating measuring and cutting conduit, said device comprising:
    a planar member;
    two end plates, each positioned on a different end of said planar member, said end plates each having an upper portion sized and configured for receiving said conduit, said upper portions each being provided with means for resisting rotation of said conduit as said conduit resides upon and is supported by said end plates, said end plates each having a lower portion extending downwardly from said planar member; and
    an extension member extending downwardly from said planar member, said extension member having a length slightly shorter than the length of said planar member, said extension member being attached to said planar member along substantially an entire length thereof, such that small gaps are formed between the ends of the extension member and the lower portions of the end plates, said gaps sized to receive a lip of a bucket.

2. The device of claim 1 wherein said planar member is ruled.

3. The device of claim 1 wherein said extension member extends at an approximate 90° angle from said planar member.

4. The device of claim 1 wherein said extension member is provided with a ruled surface.

5. The device of claim 1 wherein at least one of said means for resisting rotation is provided with a V-shaped tooth surface.

6. The device of claim 1 wherein at least one of said means for resisting rotation is provided with a coating of friction enhancing material.

7. The device of claim 6 wherein said friction enhancing material comprises polyurethane.

8. The device of claim 1 wherein at least one of said means for resisting rotation is provided with means for removably retaining an elastic stretch cord thereon.

9. A device for facilitating measuring and cutting conduit, said device comprising:
    a bucket;
    a planar member;
    two end plates, each positioned on a different end of said planar member, said end plates each having an upper portion sized and configured for receiving said conduit, said upper portions each being provided with means for resisting rotation of said conduit as said conduit resides upon and is supported by said end plates, said end plates each having a lower portion extending downwardly from said planar member; and
    an extension member extending downwardly from said planar member, said extension member having a length slightly shorter than the length of said planar member, said extension member being attached to said planar member along substantially an entire length thereof, such that small gaps are formed between the ends of the extension member and the lower portions of the end plates, said gaps sized to receive a lip of the bucket.

10. A method of measuring and cutting conduit to a desired length, said method comprising providing a bucket having an open end and circumference and further providing a device comprising:
    a planar ruled member;
    two end plates, each positioned on a different end of said planar member, said end plates each having an upper portion sized and configured for receiving said conduit, said upper portions each being provided with means for resisting rotation of said conduit as said conduit resides upon and is supported by said end plates, said end plates each having a lower portion extending downwardly from said planar member; and
    an extension member extending downwardly from said planar member, said extension member having a length slightly shorter than the length of said planar member, said extension member being attached to said planar member along substantially an entire length thereof, such that small gaps are formed between the ends of the extension member and the lower portions of the end plates, said gaps sized to receive a lip of the bucket,
    said method further comprising placing the gaps of the device upon the lip of the bucket, resting said conduit upon said end plates, using said planar ruled member to measure a length of the conduit to be cut, and cutting said conduit while said conduit is forcible pressed against said end plates.

* * * * *